3,249,658
PROCESSES FOR CURING RUBBER COMPOUNDS
William E. Hodges, Toronto, Ontario, Canada, assignor of one-fourth interest to John Schorscher, Downsview, Ontario, Canada, and one-fourth interest to George Herman, Willowdale, Ontario, Canada
No Drawing. Filed Oct. 5, 1964, Ser. No. 401,671
12 Claims. (Cl. 264—25)

This application is a continuation-in-part of my earlier filed application 216,329, filed August 13, 1962.

This invention, in one form, relates to processes for curing vulcanizable rubber compounds. This invention also relates to methods for manufacturing new tires and retreading used tires. More particularly, this invention relates to the curing of a vulcanizable rubber compound by the incorporation therein of finely divided particles of magnetite or other electrically conductive, ferromagnetic material (e.g., iron particles) having a Curie point equal to or greater than the Curie point of magnetite and a temperature-time curve having a slope equal to or greater than the slope of temperature-time curve magnetite, both curves being obtained under the same conditions, and the subsequent heating of the culvanizable rubber compound containing the particles by the placement of the same in a high frequency electromagnetic field, whereby the magnetic component of the high frequency electromagnetic field causes the particles to heat rapidly, the heat being used to cure or vulcanize the vulcanizable rubber compound.

In the past, the curing of vulcanizable rubber compounds and the retreading of tires has to some extent been accomplished by utilizing processes based on dielectric heating wherein the vulcanizable rubber compound is heated as a result of the electric component of a high frequency electromagnetic field. Examples of such processes are shown in the following United States patents: 2,421,096 dated May 27, 1947, to C. W. Vogt; 2,421,097 dated May 27, 1947, to E. E. Lakso; 2,474,517 dated June 28, 1949, to J. L. Daum et al.; 2,421,101 dated May 27, 1947, to E. E. Lakso; 2,421,100 dated May 27, 1947, to E. E. Lakso; 2,421,102 dated May 27, 1947, to E. E. Lakso; 2,421,098 dated May 27, 1947, to C. W. Vogt et al.; and 2,438,952 dated April 6, 1948, to T. A. Te Grotenhuis. A decided disadvantage of the dielectric heating method is the care which must be taken in the design of the heating apparatus to bring about uniform heating throughout the rubber compound, since non-uniformity of heating, and hence curing, will occur as a result of variations in the configuration of the vulcanizable rubber compound. Thus, where the rubber to be cured is formed in an odd configuration, rather than a regular configuration, special care must be taken in the design of the heating apparatus to ensure uniformity of heating, and, generally speaking, the specially designed heating apparatus will have limited applicability, because of the fact that it is designed to perform a heating function for only one particular configuration of uncured rubber, and, if this configuration is materially altered, the heating apparatus also must be altered. The recognition of this problem and an attempt to solve it is outlined in United States Patents 2,307,624, dated March 6, 1945, to H. C. Gillespie. The nature of this problem is even more apparent in the aforementioned Patent No. 2,438,952.

Accordingly, it is one object of my invention to provide processes for curing vulcanizable rubber compounds wherein a vulcanizable rubber compound in any configuration may be heated uniformly without the employment of specially designed heating apparatus made to conform to the irregularities in the configuration of the rubber compound to be cured.

It also is common practice in the curing of vulcanizable rubber compounds, as, for example, in the curing of pure rubber, or the curing of tread rubber of a tire to be retreaded, to obtain the heat for curing from steam, hot water or electricity (resistance heating). A disadvantage of this approach is the excessive length of time taken to cure the rubber compound. For example, 50 minutes is not an excessive time for the curing of the tread rubber or a tire of a passenger vehicle to be retreaded by the aforementioned curing processes employing steam, hot water or electricity.

Accordingly, it is another important object of my invention to provide processes for curing vulcanizable rubber compounds which materially reduce the time taken to cure the rubber compounds.

In brief, I provide a process for curing a vulcanizable rubber compound having finely divided particles of magnetite or other electrically conductive, ferromagnetic material (e.g., iron particles) having a Curie point equal to or greater than the Curie point of magnetite and a temperature-time curve having a slope equal to or greater than the slope of temperature-time curve of magnetite, both curves being obtained under the same conditions, distributed therein. The process comprises subjecting the vulcanizable rubber compound having the aforementioned particles distributed therein to a high frequency electromagnetic field, whereby the magnetic component of the electromagnetic field causes rapid heating of the particles. The heat so produced is utilized to cure the vulcanizable rubber compound. The rubber compound is maintained in the electromagnetic field until it is cured.

While my invention may be utilized to manufacture tires, or may be employed in the retreading of tires, the resultant product also may be used for the purpose of providing magnetic shielding. For example, a product produced in accordance with my invention may be used as an insulator for electrical conductors. Such insulation acts as a magnetic shield for any electrical conductor about which it is wrapped because of the relatively high permeability of the insulation.

My invention will become more apparent from the following detailed disclosure. In acordance with my invention, a vulcanizable rubber compound is mixed with finely divided particles of a suitable electrically conductive, ferromagnetic material.

Any type of vulcanizable rubber compound may be employed, the rubber component of the compound being either a synthetic rubber or natural rubber (smoked sheets, pale crepe, bark). Generally speaking the vulcanizable rubber compound, in addition to rubber, will include reinforcing agents, i.e. fillers such as clay; aging ingredients such as antioxidants; vulcanizing agents such as sulphur, accelerators, retarders; and processing aids such as plasticizers, all of which are well known in the art, but it must be understood that the composition of the vulcanizable rubber compound is not material insofar as this invention is concerned, and, as aforementioned, any vulcanizable rubber compound that will cure under the influence of heat may be employed in the practice of this invention.

The type of electrically conductive, ferromagnetic material which is employed is of considerable importance, since extensive tests have indicated that rapid, economical curing can only be obtained using certain types of particles. In addition to being ferromagnetic and electrically conductive, the particles should have as high a permeability as possible. The particles also must have a Curie point which is quite substantially greater than the curing temperature of the vulcanizable rubber compound in which they are distributed. Thus, magnetite has a Curie temperature of 1085° F., while vulcanizable rubber compounds generally have curing temperatures of the order of 275° F. to 315° F. The curing temperature of the vulcanizable rubber compound used in the specific example set out hereinafter was 295° F. The most preferred material for use in the practice of this invention is magnetite ($Fe_3O_4$) which has a permeability and an electrical resistance which make it eminently suitable. Moreover, magnetite is a readily available mineral and is relatively inexpensive.

If magnetite particles are subjected to heating in an electromagnetic field of varying strength and the temperature of the particles is plotted against time for the different fields, a series of curves, one for each field strength, will be obtained, the curves for fields of greater strength being above the curves for fields of lesser strength. Each curve will have a generally straight upwardly inclined initial portion but then will flatten out.

If particles of a material other than magnetite are selected for the practice of this invention, the material must not only be ferromagnetic, electrically conductive and have a Curie point equal to or greater than that of magnetite, but also must have a temperature-time curve the slope of the initial part of which is the same as or greater than the slope of the initial part of the temperature-time curve of magnetite, both curves being derived under the same conditions. If desirable, iron particles may be substituted for magnetite particles.

Particle size is of some importance, and I have discovered that a particle size of less than 100 microns can be employed most effectively.

As aforementioned, the magnetite or iron is in the form of finely divided particles. The finely divided particles are homogeneously distributed throughout the vulcanizable rubber compound in any suitable manner. For example, the particles may be incorporated in the vulcanizable rubber compound in a conventional rubber mill of the type which is commonly used to incorporate promoters, catalysts, retarders or the like in natural rubber. Following the incorporation of the finely divided particles of magnetite or iron into the vulcanizable rubber compound, the compound is subjected to a high frequency electromagnetic field obtained from any suitable conventional apparatus such as an induction generator. The strength of this field is of some importance. The field must be strong enough to heat the particles sufficiently that the vulcanizable rubber compound can be elevated to its curing temperature. The power output of the induction generator should be greater than that which is required to achieve this result. In this manner rapid curing of the rubber may be achieved. Of course, care must be taken not to heat the magnetite or iron particles so quickly as to cause charring of the rubber compound. The magnetic component of the high frequency electromagnetic field initiates rapid heating of the magnetite or iron particles, which, in turn, cures the vulcanizable rubber compound. The vulcanizable rubber compound is maintained in the electromagnetic field until it is completely cured. When this has occurred can be determined from the fact that the curing temperature of the rubber compound is known, and thermocouples can be placed in the compound to indicate when this temperature has been reached, at which time the induction generator should be shut off. During the time that temperature is being measured the induction generator should be shut off so that it will not cause direct heating of the thermocouple. Of course, the power and time required to cure any given vulcanizable rubber compound containing any given amount of magnetite or iron particles homogeneously distributed throughout the same can be determined precisely, and, once known, the use of thermocouples can be dispensed with. Unless it is desired to form cured rubber in cellular form, as in the case of foam rubber, during curing of the vulcanizable rubber compound it should be maintained under a pressure substantially greater than atmospheric pressure, as is known in the art.

If the finely divided, electrically conductive particles of magnetite or iron are homogeneously distributed throughout the vulcanizable rubber compound, there will be uniform heating of the compound, regardless of its configuration. It is important to note, however, that the heating effect at various points in the compound may be varied by varying the number of particles in different areas of the compound. Thus, if it is desired to cure only the outer surfaces of a sheet of vulcanizable rubber compound, and to partially cure the body of the sheet, this may be achieved by employing a high proportion of magnetite or iron particles at the surfaces of the sheet, and a lower proportion in the body of the sheet between the surfaces. When such a sheet is subjected to a high frequency electromagnetic field, the heating effect at the surfaces will be greater than the heating effect in the body of the sheet, and, consequently, when the surfaces of the sheet are completely cured, the body of the sheet will be only partially cured. It will be appreciated that for an electromagnetic field having a magnetic component of any given magnitude, a wide variation in heating effect may be achieved, dependent upon the permeability of the particles, the degree of electrical conductivity of the particles and their density.

The following is a specific example of a process embodying my invention for the retreading of a used tire casing. Four pounds of conventional, uncured, retread rubber (a vulcanizable rubber compound) was mixed in a hand-operated rubber mill with one pound of finely powdered $Fe_3O_4$. The retread rubber had the following composition:

|  | Percent |
|---|---|
| Natural rubber (smoked sheet) | 50 |
| Reinforcing agents | 40 |
| Vulcanizing agents, ageing ingredients and processing aids | 10 |

The powder had a particle size of from 10 to 70 microns. The electrically conductive particles of magnetite were homogeneously distributed throughout the tread rubber, which, with the particles of magnetite therein, was formed into a sheet approximately $12/32''$ in thickness. This sheet was bonded to the tread surface of a part of used tire casing which had previously been buffed, etc., and otherwise treated in a conventional manner. The agent used to bond the sheet to the used tire casing was conventional, uncured, rubber tire shop cement (a vulcanizable rubber compound) having particles of $Fe_3O_4$ homogeneously distributed therein. The used tire casing with the thread rubber thereon was placed in a segment of conventional, doughnut-shaped, curing mold made of electrically conductive material, i.e., aluminum, and having on its inner surface a tread pattern. The output terminals of an elongated, single turn secondary coil of an induction generator rated at 12 kilowatts were connected at a plurality of points around the periphery to either side of the generally U-shaped (in cross-section) curing mold, the secondary coil being coupled with the primary coil of the generator, and a conventional curing bag exerting a pressure of at least 25 lbs. per sq. inch on the tread rubber was employed. Suitable clamps were used to clamp the free edges of the mold. The induction generator was operated at an output of 4 kilowatts at a frequency of 1 megacycle. In 12 minutes operation it was found that the tread rubber was completely cured. It also should be noted that in contrast to prior art curing methods which require the use of a mold release, it was found that when proceeding in accordance with the aforementioned example, no mold release was required, and the mold remained perfectly clean. A complete used tire casing may be retreaded in a similar manner employing an appropriate increase in power.

Where is it desired to cure a complete tire in accordance with my invention, the tire is made from a vulcanizable rubber compound having finely divided particles of electrically conductive materials such as $Fe_3O_4$ distributed homogeneously therein. The tire then is placed in a conventional mold, and a conventional curing bag inflated to a suitable pressure is employed, as has been done in the past. An induction generator is connected at a number of spaced-apart points to the opposite sides of the electrically conductive curing mold which, in effect, makes the curing mold into a plurality of single electrical turns all connected in parallel. The tire is cured by subjecting it to the electromagnetic field created by the induction generator. The procedure which is followed is the same as noted in the previous example.

Where a tire to be retreaded or manufactured has a metal bead, care must be taken to ensure that the metal bead does not overheat as a result of the high frequency electromagnetic field. This is achieved by winding the conductors from the output terminals of the induction generator to the curing mold in the form of helical coils, which have the effect of restricting the magnetic field created thereby to an area in proximity to the helical coils.

One important feature of this invention is the fact that as long as the flux density in a large volume of a vulcanizable rubber compound containing particles of $Fe_3O_4$, for example, is the same as the oscillating magnetic flux density in a much smaller volume of the same material, the two volumes will be cured in the same time, this being an advantage not obtainable with steam curing, for example.

Tests on rubber produced in accordance with this invention indicate that the rubber has desirable properties of toughness and gripping ability.

While I have disclosed a preferred embodiment of my invention, those skilled in the art will appreciate that changes and modifications may be made thereto without departing from the spirit and scope of my invention as defined in the appended claims.

What I claim as my invention is:

1. A process for curing a vulcanizable rubber compound which comprises incorporating in and distributing throughout said vulcanizable rubber compound finely divided particles of an electrically conductive ferromagnetic material having a Curie point substantially greater than the curing temperature of said vulcanizable rubber compound and at least as great as the Curie point of magnetite and a temperature-time curve having the slope of its initial portion at least as great as the slope of the initial portion of the temperature-time curve of magnetite of the same particle size (both curves being derived under the same conditions), subjecting said vulcanizable rubber compound having said particles distributed therein to a high frequency electromagnetic field of a strength sufficiently high to heat said particles to a temperature sufficient to elevate said vulcanizable rubber compound to a temperature in excess of the curing temperature of said vulcanizable rubber compound, and maintaining said vulcanizable rubber compound in said electromagnetic field until said vulcanizable rubber compound is cured.

2. A process for curing a vulcanizable rubber compound which comprises incorporating in and distributing throughout said vulcanizable rubber compound finely divided particles of magnetite, subjecting said vulcanizable rubber compound having said particles distributed therein to a high frequency electromagnetic field of a strength sufficiently high to heat said particles to a temperature sufficient to elevate said vulcanizable rubber compound to a temperature in excess of the curing temperature of said vulcanizable rubber compound, and maintaining said vulcanizable rubber compound in said electromagnetic field until said vulcanizable rubber compound is cured.

3. A process according to claim 2 wherein said particles are distributed homogeneously throughout said vulcanizable rubber compound.

4. A process according to claim 3 wherein pressure in excess of normal atmospheric pressure is applied to said vulcanizable rubber compound during curing thereof.

5. A process for curing a vulcanizable rubber compound which comprises incorporating in and distributing throughout said vulcanizable rubber compound finely divided particles of iron, subjecting said vulcanizable rubber compound having said particles distributed therein to a high frequency electromagnetic field of a strength sufficiently high to heat said particles to a temperature sufficient to elevate said vulcanizable rubber compound to a temperature in excess of the curing temperature of said vulcanizable rubber compound, and maintaining said vulcanizable rubber compound in said electromagnetic field until said vulcanizable rubber compound is cured.

6. A process for curing a vulcanizable rubber compound having finely divided particles of an electrically conductive ferromagnetic material having a Curie point substantially greater than the curing temperature of said vulcanizable rubber compound and at least as great as the Curie point of magnetite and a temperature-time curve having the slope of its initial portion at least as great as the slope of the initial portion of the temperature-time curve of magnetite of the same particle size (both curves being derived under the same conditions), distributed therein which comprises subjecting said vulcanizable rubber compound having said particles distributed therein to a high frequency electromagnetic field of a strength sufficiently high to heat said particles to a temperature sufficient to elevate said vulcanizable rubber compound to a temperature in excess of the curing temperature of said vulcanizable rubber compound, and maintaining said vulcanizable rubber compound in said electromagnetic field until said vulcanizable rubber compound is cured.

7. A process for curing a vulcanizable rubber compound having finely divided particles of magnetite distributed therein which comprises subjecting said vulcanizable rubber compound having said particles distributed therein to a high frequency electromagnetic field of a strength sufficiently high to heat said particles to a temperature sufficient to elevate said vulcanizable rubber compound to a temperature in excess of the curing temperature of said vulcanizable rubber compound, and maintaining said vulcanizable rubber compound in said electromagnetic field until said vulcanizable rubber compound is cured.

8. A process according to claim 7 wherein said particles are distributed homogeneously throughout said vulcanizable rubber compound.

9. A process according to claim 7 wherein pressure in excess of normal atmospheric pressure is applied to said vulcanizable rubber compound during curing thereof.

10. A process according to claim 7 wherein said particles are of a size less than about 100 microns.

11. A process for curing a vulcanizable rubber compound having finely divided particles of iron distributed therein which comprises subjecting said vulcanizable rubber compound having said particles distributed therein to a high frequency electromagnetic field of a strength sufficiently high to heat said particles to a temperature sufficient to elevate said vulcanizable rubber compound to a temperature in excess of the curing temperature of said vulcanizable rubber compound, and maintaining said vulcanizable rubber compound in said electromagnetic field until said vulcanizable rubber compound is cured.

12. A process according to claim 6 wherein pressure in excess of normal atmospheric pressure is applied to said vulcanizable rubber compound during curing thereof, and wherein said vulcanizable rubber compound constitutes at least a part of a tire.

References Cited by the Examiner

UNITED STATES PATENTS

| 2,393,541 | 1/1946 | Kohler | 219—10.41 |
|---|---|---|---|
| 2,421,099 | 5/1947 | Vogt | 264—36 |
| 2,438,952 | 4/1948 | Te Grotenhius | 264—26 |

ROBERT F. WHITE, *Primary Examiner.*

M. H. ROSEN, R. B. MOFFITT, *Assistant Examiners.*